United States Patent [19]
Harting et al.

[11] 4,085,683
[45] Apr. 25, 1978

[54] PLASTIC CLOSURE FOR NAILABLE STEEL FLOORING PANELS

[75] Inventors: Gary L. Harting, St. Charles; Robert F. Sutter, St. Louis; Lowell L. Malo, St. Peters, all of Mo.

[73] Assignee: ACF Industries, Incorporated, New York, N.Y.

[21] Appl. No.: 749,141

[22] Filed: Dec. 9, 1976

Related U.S. Application Data

[63] Continuation-in-part of Ser. No. 562,998, Mar. 27, 1975, abandoned.

[51] Int. Cl.² ............................................. B61D 17/10
[52] U.S. Cl. ..................................... 105/424; 105/422
[58] Field of Search ............... 105/355, 366 E, 371, 105/422, 423, 463, 375, 376, 404, 412, 424; 296/28 F, 28 M; 52/375, 376, 377; 244/118 R; 114/85; 49/488

[56] References Cited

U.S. PATENT DOCUMENTS

| | | | |
|---|---|---|---|
| 2,142,797 | 1/1939 | Murphy | 105/422 |
| 2,813,497 | 11/1957 | Jaeckle | 105/424 |
| 3,194,184 | 7/1964 | Murray | 105/422 |
| 3,438,149 | 4/1969 | Ilg | 105/376 X |
| 3,602,474 | 8/1971 | Deering et al. | 105/366 E X |
| 3,885,506 | 5/1975 | Mundinger et al. | 105/422 X |

FOREIGN PATENT DOCUMENTS

| | | | |
|---|---|---|---|
| 594,900 | 3/1960 | Canada | 105/424 |
| 910,127 | 9/1972 | Canada | 105/424 |
| 1,216,886 | 4/1960 | France | 49/488 |

*Primary Examiner*—Randolph A. Reese
*Attorney, Agent, or Firm*—Henry W. Cummings

[57] ABSTRACT

A plastic nailable steel flooring insert is provided including a generally vertical end closure closing one of the vertical openings which occurs at opposite ends of nailable steel flooring panels extending in a transportation vehicle to a position adjacent, but laterally spaced from, a generally vertical wall in the vehicle, and at least one gap closure flap attached to a first face of the end closure effective to engage the vehicle wall in interference fit and close the gap between the end closure and the vehicle wall. In engaged position the flap is at least partially deformed and thereby urges the insert into engagement with the nailable steel flooring panel and the vehicle wall. The insert may include a retainer portion to maintain engagement between the insert and the nailable steel flooring panel. The retainer portion may be mounted on the face of the insert facing the nailable steel flooring panel and may engage reinforcement located within the nailable steel flooring panel. Alternatively, the retainer portion may be mounted on the same face of the insert as the gap closure. Indexing tabs may be provided to facilitate insertion of the insert into the panel, and/or to aid in maintaining the insert in place.

39 Claims, 18 Drawing Figures

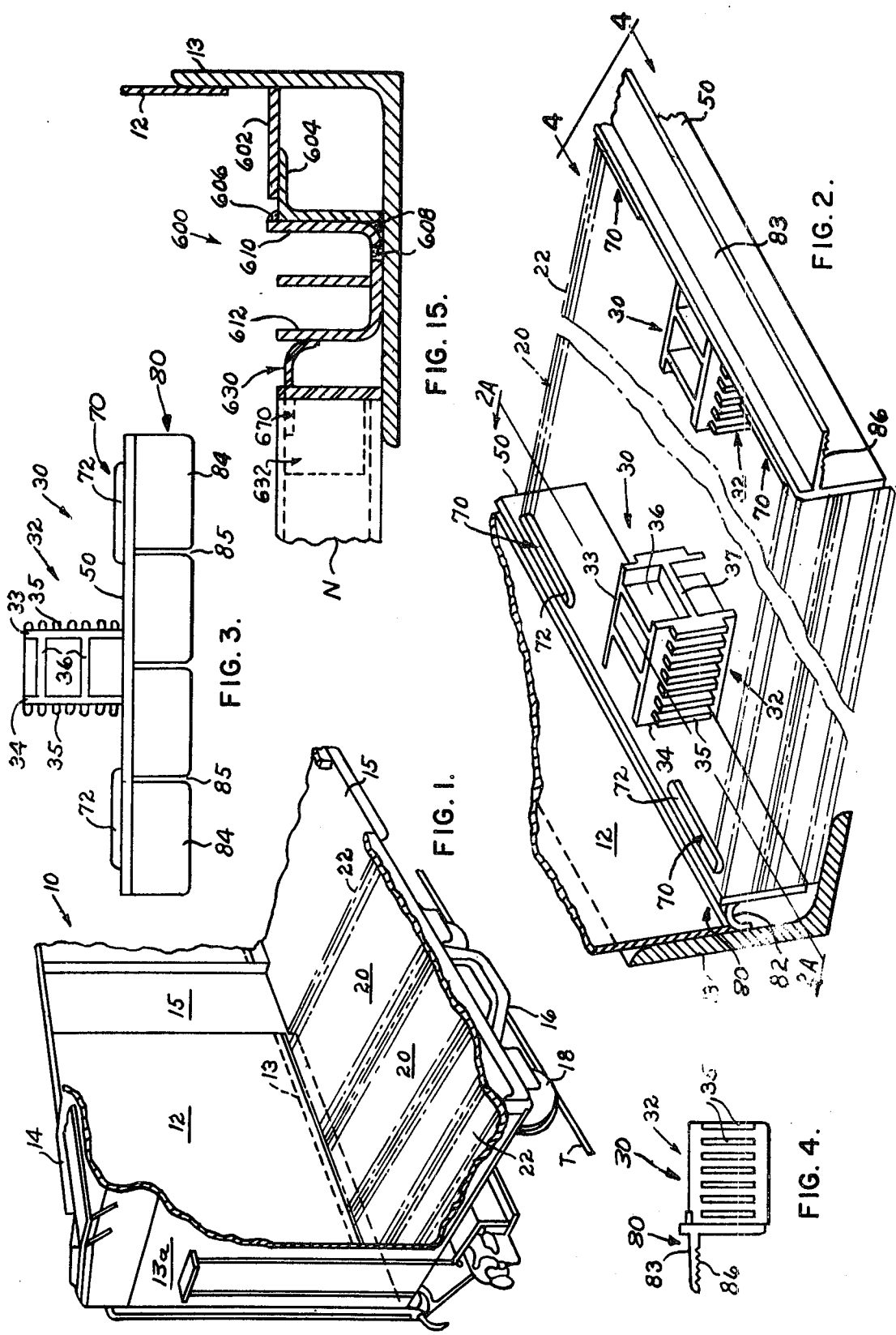

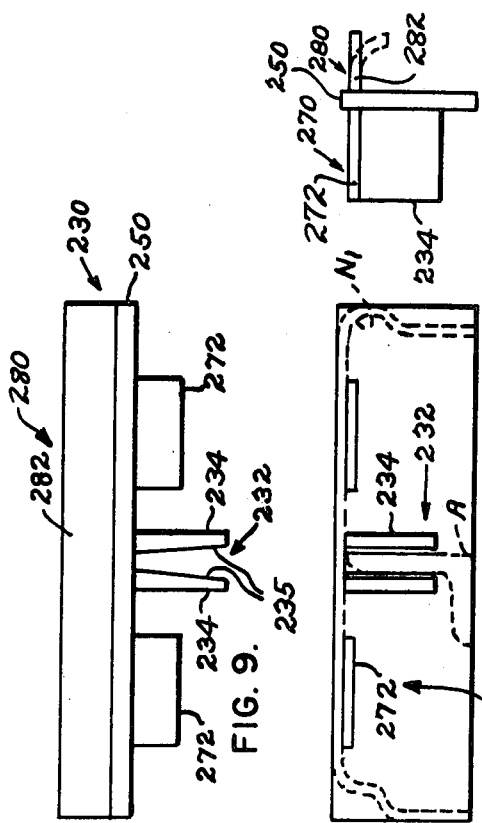
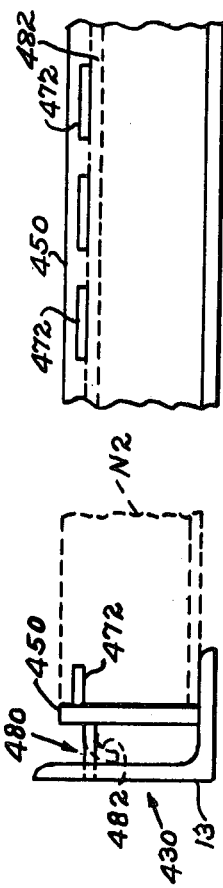
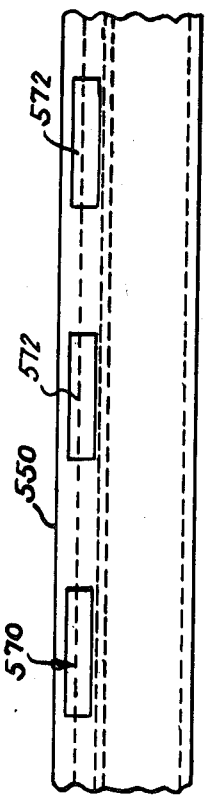
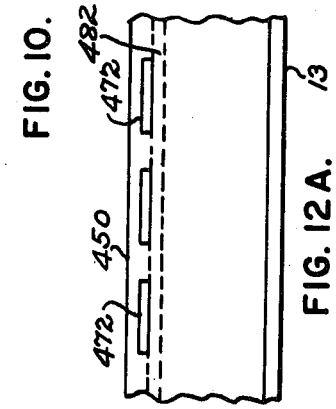
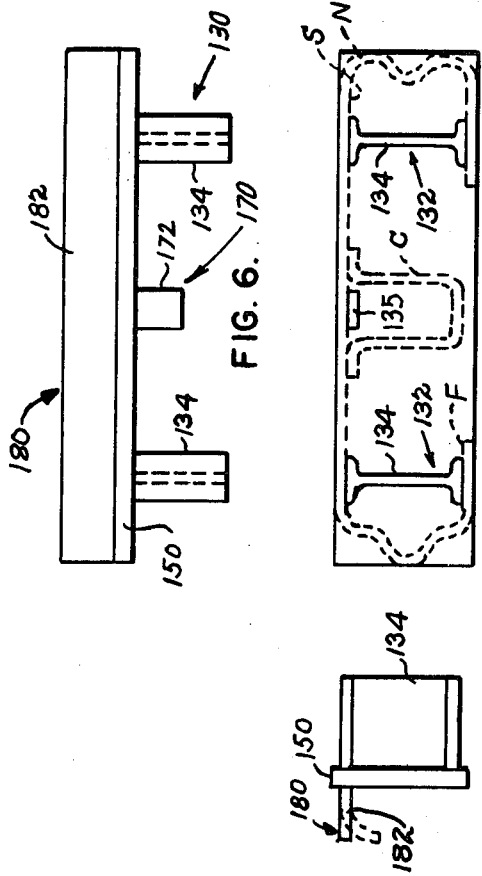
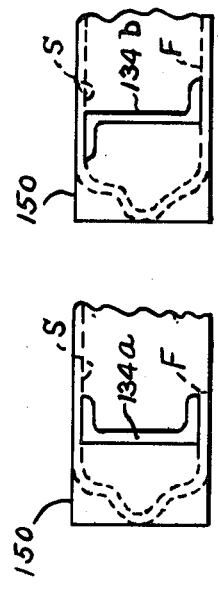
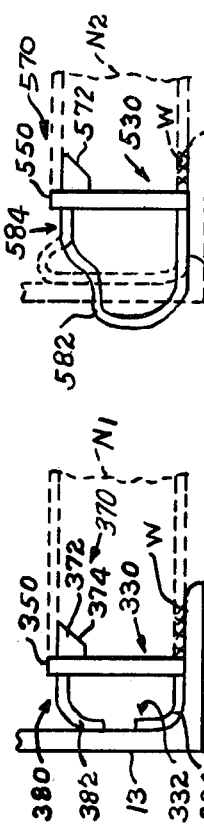

PLASTIC CLOSURE FOR NAILABLE STEEL FLOORING PANELS

REFERENCE TO RELATED APPLICATION

This application is a continuation-in-part of application Ser. No. 562,998 filed Mar. 27, 1975, now abandoned.

BACKGROUND OF THE INVENTION

In order to close the box car interior to the outside elements, it is necessary to close over the vertical open ends of nailable steel flooring (NSF) panels which currently extend transversely in the car. Application of individual steel closure panels is expensive and time consuming.

Currently, steel closure strips are applied vertically in approximately four foot sections to the NSF panels after the NSF panels are welded in the car. Fit-up of this closure to the floor panels is sometimes difficult, due to panel length tolerances and/or application tolerances resulting in occasional gaps which must be caulked. This caulking operation is time consuming and expensive. Furthermore, positioning and welding of the thin gage (10) sheet closure strips is difficult and rework is sometimes required.

Due to car building and floor manufacturing tolerances, it is necessary to provide a gap between the sides of the car and the floor panels. While this gap allows for car building tolerances, it provides an area that collects dirt and other debris which is intolerable in cars carrying food stuffs. It is therefore necessary to close or fill in this gap to prevent accumulation of undesirable matter.

Presently, this gap is closed by filling the major portion with an extruded foam. A caulking material is then applied which closes the remaining portion of the gap.

During car use, however, relative movement between the car body and flooring often either loosens the foam or causes the caulking to sag, resulting in a gap which can collect dirt and/or debris.

SUMMARY OF THE INVENTION

A plastic nailable steel flooring insert is provided including a generally vertical end closure closing one of the vertical openings which occurs at opposite ends of nailable steel flooring panels extending in a transportation vehicle to a position adjacent, but laterally spaced from, a generally vertical wall in said vehicle, and at least one gap closure flap attached to a first face of said end closure effective to engage the vehicle wall in interference fit and close the gap between said end closure and said vehicle wall. In engaged position the flap is at least partially deformed and thereby urges the insert into engagement with said nailable steel flooring panel and the vehicle wall. The insert may include retainer means to maintain engagement between the insert and the nailable steel flooring panel. The retainer means may be mounted on the face of the insert facing the nailable steel flooring panel and may engage reinforcement located within the nailable steel flooring panel. Alternatively, the retainer means may be mounted on the same face of the insert as the gap closure means. Indexing means may be provided to facilitate insertion of the insert into place, to locate the insert vertically relative to the panel and/or to assist in maintaining the insert in place. In one embodiment the retainer means may comprise a flap mounted below the gap closure means. In other embodiments the gap closure means and retainer means are combined into a single element. The insert may be used adjacent to a bulkhead floor track if bulkheads are installed in the vehicle or adjacent other structure mounted on the side or end of the vehicle.

THE DRAWINGS

FIG. 1 is a perspective sectional view of a railway box car;

FIG. 2 is an enlarged perspective view of a portion of the box car shown in FIG. 1 with the nailable steel flooring panel shown in phantom;

FIG. 3 is a plan view of a portion of a plastic closure inserted described in the present invention;

FIG. 4 is an end elevation of a plastic closure insert of one embodiment of the present invention looking in the direction of the arrows along the line 4—4 in FIG. 2 with the nailable steel flooring panel removed;

FIG. 5 is an end elevation of another embodiment of the present invention with the nailable steel flooring panel shown in phantom;

FIG. 5A is a partial end elevation similar to FIG. 5 of another embodiment of the present invention;

FIG. 5B is a partial end elevation of another embodiment of the present invention;

FIG. 6 is a plan view of FIG. 5 with the nailable steel flooring panel removed;

FIG. 7 is an end view of FIG. 5 with the nailable steel flooring panel removed;

FIG. 8 is an end elevation of another embodiment of the present invention another type of nailable steel flooring panel shown in phantom;

FIG. 9 is a plan view of FIG. 8 with the nailable steel flooring panel removed;

FIG. 10 is an end elevation of FIG. 8 with the nailable steel flooring panel removed;

FIG. 11 is an end elevation of another embodiment of the present invention with the nailable steel flooring panel shown in phantom;

FIG. 12 is an end elevation of another embodiment of the present invention with the nailable steel flooring panel shown in phantom;

FIG. 12A is a front view of FIG. 12;

FIG. 13 is a front view of another embodiment of the present invention;

FIG. 14 is an end elevation of FIG. 13 with the nailable steel flooring panel shown in phantom;

FIG. 15 is a sectional view of another embodiment of the present invention with the nailable steel flooring panel shown in phantom.

DESCRIPTION OF PREFERRED EMBODIMENTS

Figure 2A:
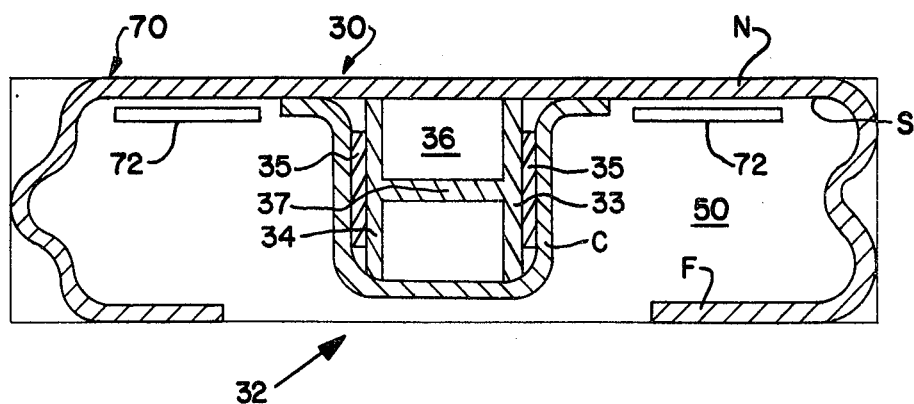
FIG. 2A is a sectional view looking in the direction of the arrows along the line 2A—2A in FIG. 2 with the nailable steel flooring panel shown in section.

A railway box car is indicated in the drawings generally at 10. The box car comprises box car sides 12, side sills 13, ends 13a, and a roof portion 14. The box car is supported on trucks 16 having wheels 18 which support the car on a track T. The box car comprises openings on either side 15 having conventional doors mounted for opening and closing the openings.

The present invention concerns the floor structure indicated in the drawings generally at 20. The floor structure comprises a plurality of nailable steel floor panels 22 which are illustrated as extending transversely in the car.

In accordance with the present invention, a plastic insert indicated generally at 30 in the drawings is provided. The insert 30 comprises a nailable steel flooring retainer means 32, a nailable steel flooring end closure 50 and gap closure means 80 for closing the gap between the NSF panel and an adjacent wall in a transportation vehicle. Indexing means 70 may also be provided to assist in locating the insert within the NSF panel, and in some instances to aid in maintaining the insert in place.

Retainer means 32 is provided to maintain engagement of the insert with a portion of the end of the nailable steel flooring panel N. If, for example, as shown in FIG. 2A, the reinforcing portion of the nailable steel flooring panel comprises a channel C, the retainer means 32 may comprise a suitable shape to fit within the channel, preferably with an interference fit to maintain the insert in position. In accordance with the embodiment shown in FIGS. 2, 2A and 3, retainer means 32 comprise spaced vertical members 33 and 34 each having suitable flooring engagement fins 35. If desired, one or more vertical reinforcing members may be provided as indicated at 36. Also, one or more horizontal reinforcing members 37 may be provided joining vertical members 33 and 34 and/or reinforcing members 36. Retainer portion 32 is so dimensioned as to make an interference fit within a channel C in the nailable steel flooring. Thus engagement fins 35 preferably exceed the transverse dimension of the channel by a suitable amount, such as 0.003 inches to 0.015 inches, to achieve the interference fit.

Retainer means 32 is integral with end closure panel 50. The purpose of closure panel 50 is to block off the open space which exists at opposite ends of the nailable steel flooring panel. Therefore closure panel 50 is preferably continuous along the outside edges of the individual nailable steel flooring panels and may be continuous over a plurality of NSF panels.

Indexing means 70 are provided as shown in FIGS. 2, 2A and 3. In this embodiment, indexing tabs 72 are spaced on opposite sides of the channel reinforcing portion C of the nailable steel flooring insert to engage the lower surface S of the flooring as the retainer means is inserted within the channel C to guide the insert into place.

Gap closure means 80 are also provided to close the gap between closure panel 50 and the car side, in this case between panel 50 and side sheet 12 and the side sill 13. In engaged position gap closure means 80 is at least partially deformed and thereby urges the insert into engagement with the nailable steel flooring panel and the vehicle wall. In handling nearly all lading it is important to close this gap and the open ends of the nailable steel flooring panels, but is it particularly important if food stuffs such as grain are to be carried in the car. Food stuffs could get into this gap or into the open panels and possibly rot therein, and/or tend to attract rodents.

In the embodiment shown in FIG. 3, the gap closure means includes a closure flap 82 comprising a plurality of panels 84 having slots 85 therebetween. Slots 85 are provided as a convenience in the molding process for forming the insert. The slots are provided so that during cooling there will be space for the flap 82 to contract and therefore warpage of the closure panel will be avoided.

However, as shown in another embodiment of the present invention illustrated in the right hand portion of FIG. 2 and in FIG. 4, a continuous flap 83 is provided and in which shrinkage contraction is provided with a plurality of saw teeth 86. This embodiment is preferred when food stuffs are to be handled in the car because it provides a continuous complete closure between the NSF panels and the car side or end.

Another embodiment of the present invention is shown in FIGS. 5 through 7. In this embodiment an insert indicated generaly at 130 is illustrated as applied to a nailable steel flooring panel N having a channel reinforcing section C. However, in this embodiment the retainer means 132 comprises a pair of spaced retainers 134. Retainers 134 are illustrated in FIG. 5 as having an I-shaped cross section. However, other cross sections, such as a channel 134a (FIG. 5A) or a Z cross section 134b (FIG. 5B), may also be used. Retainer members 134a and 134b respectively, engage the lower surface S of the nailable steel flooring panel and the upper surface of the lower flange F in the panel.

Thus it is apparent that the retainer portions can engage the flanges F of the nailable steel flooring as well as the channel section C.

Retainers 134 are integral with a closure panel 150 as shown in FIG. 6. Gap closure means 180, for example, comprising a continuous closure flap 182 are provided. If desired, indexing means 170 may also be provided. An indexing tab 172 may be provided to fit within channel section C to guide movement of the insert into place.

All nailable steel flooring panels do not comprise channels for reinforcement. Another type of nailable steel flooring panel $N_1$ which is common in the industry is illustrated in FIG. 8 and comprises a reinforcing angle A. In the embodiment shown in FIGS. 8 - 11 the insert 230 comprises a retainer portion 232 including spaced retainer ribs 234 which engage on opposite sides of angle A. If desired, the internal surface of the ribs 234 may be tapered as indicated at 235 in FIG. 9 to facilitate inserting of the insert 232 into the nailable steel flooring panel. Insert 230 further comprises indexing means 270 comprising longitudinally spaced indexing tabs 272, and a closure panel 250. Gap closure means 280 preferably comprise a continous closure flap 282.

It is apparent from this embodiment that the insert of the present invention is readily adaptable to angle shaped reinforced nailable steel flooring. Furthermore, retainers 134 (FIGS. 5 - 7) may be used with angle, Z-shaped or other nailable steel flooring reinforcement (not shown) if the flanges F shown in FIGS. 5 - 7 are provided for engagement by retainers 134.

FIG. 11 illustrates an embodiment of the present invention for use when the nailable steel flooring panels $N_1$ have already been welded in place as indicated at W to a side sill angle 13. The insert 330 comprises a closure panel 350 which blocks off the opening in the NSF panel $N_1$. Gap closure means 380 is provided including an upper closure flap 382 to close the gap between the NSF panel and the car side. In this embodiment the retainer portion 332 is located on the same side of the closure panel as the closure means. The retainer portion comprises a flexible flap 334 similar to but located below closure flap 382. Indexing means 370 are provided including at least one, and preferably a pair of longitudinally spaced indexing tabs 372, preferably tapered as indicated at 374 so that the operator may merely slide the inserts downwardly and they will snap into place in the opening in the closure panel $N_1$. Upper closure flap 382 and lower flap 334 urge the insert 330 inwardly and into engagement with the nailable steel flooring panel. It will be apparent that in addition to guiding the inserts into place, tabs 372 function in cooperation with retainer members 332 to retain the insert in place. This embodiment may be used with channel, angle or Z-shaped NSF reinforcement, and does not require that the insert engage the reinforcement in the nailable steel flooring panel.

The insert of the present invention can be produced other ways than by casting. For example, as shown in FIGS. 12 and 12A an extruded insert is indicated generally at 430. This insert comprises a closure panel 450 and gap closure means 480 comprising a continuous closure flap 482. Closure flap 482 also functions as a retainer to urge the insert into engagement with the nailable steel flooring panel $N_2$. Indexing means 470 including a plurality of spaced indexing tabs 472 are provided by an extrusion process. During the extrusion process a die fills the space between the tabs 472 to form the spaced tabs 472.

In accordance with this embodiment the inserts 430 may extend over more than one nailable steel flooring panel. The inserts 430 may extend longitudinally along the sides of the car for as long a length as desired and then may be cut off to suit the length of specific car requirements. In the use of this embodiment, the nailable steel flooring will be laid in place prior to insertion of the inserts 430. As was the case with FIG. 11, indexing means 470, in addition to guiding the insert into place, cooperate with closure flap 482 and prevent the insert from escaping from between the box car side and the NSF panel.

In another embodiment of the present invention shown in FIGS. 13 and 14, the insert 530 comprises a closure panel 550, indexing means 570 including indexing tabs 572, and a combination retainer and closure means comprising a loop-type closure flap 582, which is joined to the closure panel 550, both at 584 and 586. When this insert is moved into place, closure flap 582 deforms as illustrated from the shape shown in solid lines to the shape shown in dotted lines in FIG. 14 to urge the insert into engagement with the closure panel and provide a closure over the gap between the nailable steel flooring and the car side. This embodiment may be produced with an extrusion technique. Tabs 572 function to guide the insert into place and act in cooperation with closure flap 582 to maintain the insert in place.

In still another embodiment of the present invention shown in FIG. 15, if bulkheads are used in the car bulkhead tracks 600 are usually provided for the bulkheads to move longitudinally in the car. The bulkhead tracks 600 are provided on each side of the car and are usually spaced from the side of the car by means of spacers 602 and suitable reinforcing members, such as angles 604. The bulkhead tracks are preferably integrally affixed to reinforcing members 604 and side sill 13 by welding indicated at 606 and 608.

In this embodiment, any of the inserts described above indicated generally at 630 may be used between nailable steel flooring panel N and bulkhead track 600. The inserts may include a retainer portion 632, a closure panel 650, indexing means 670 and gap closure means 680, as described above. Thus vertical portion 612 of the bulkhead track is equivalent to the side of the car insofar as the operation of the nailable steel flooring inserts are concerned in the embodiment shown in FIG. 15.

It will be apparent that other structure may be mounted along the side or end of the vehicle as illustrated by the bulkhead track shown in FIG. 15. Insofar as the nailable steel flooring inserts of the present invention are concerned, such structure is intended to be included within the meaning of the term wall of the car or vehicle in the present specification and claims.

Thus it will also be apparent that the insert of the present invention may be used at the ends of a box car with NSF panels if the panels are placed longitudinally in the car, Furthermore, the plastic insert of the present invention may be utilized with NSF panels provided in other transportation vehicles, such as overload tanks.

What is claimed:

1. A nailable steel flooring insert comprising: a plastic member including a generally vertical end closure closing one of the vertical openings which occurs at opposite ends of nailable steel flooring panels extending in a transportation vehicle to a position adjacent, but laterally spaced from, a generally vertical wall in said vehicle; at least one gap closure flap attached to a first face of said end closure effective to engage the vehicle wall in interference fit and close the gap between said end closure and said vehicle wall; in engaged position said flap being at least partially deformed and thereby urging said insert into engagement with said nailable steel flooring panel and said vehicle wall.

2. An insert according to claim 1 wherein said retainer means comprises a retainer portion affixed to a second face of said insert opposite to said first face which retainer portion engages at least a portion of said panel.

3. An insert according to claim 2 wherein indexing means are provided on said second face to direct said insert into place in engagement with said panel.

4. An insert according to claim 3 wherein said indexing means comprise at least one indexing tab mounted on said second face.

5. An insert according to claim 2 wherein said retainer portion comprises means for engaging reinforcement in said nailable steel flooring panel.

6. An insert according to claim 5 wherein said reinforcement comprises a channel section and wherein said retainer portion comprises means for engaging said channel section.

7. An insert according to claim 6 wherein said retainer portion comprises spaced vertical members which extend into said channel section.

8. An insert according to claim 7 wherein said retainer portion is provided with reinforcing members between said spaced vertical members.

9. An insert according to claim 8 wherein said retainer portion comprises fins mounted on said spaced vertical members which engage at least a portion of said channel section.

10. An insert according to claim 5 wherein said retainer portion is adapted to engage a reinforcing angle in said nailable steel flooring.

11. An insert according to claim 10 wherein said retainer portion comprises spaced ribs which engage said angle.

12. An insert according to claim 11 wherein said spaced ribs are provided with a taper to facilitate movement of said ribs into place in engagement with said angle.

13. An insert according to claim 2 wherein said retainer portion is adapted to engage at least one lower flange of said nailable steel flooring panel.

14. An insert according to claim 13 wherein said retainer portion engages a plurality of lower flanges of said nailable steel flooring panel.

15. An insert according to claim 13 wherein said retainer portion comprises at least one I-section.

16. An insert according to claim 13 wherein said retainer portion comprises at least one channel section.

17. An insert according to claim 13 wherein said retainer portion comprises at least one Z-section.

18. An insert according to claim 1 wherein said closure flap is provided with a plurality of slots spaced longitudinally along the flap.

19. An insert according to claim 1 wherein said closure flap is continuous along the length of at least one panel.

20. An insert according to claim 19 wherein said insert is a casting and wherein said closure flap includes a plurality of teeth to allow for shrinkage of said casting during cooling.

21. A nailable steel flooring insert comprising: a plastic member including a generally vertical end closure closing one of the vertical openings which occurs at opposite ends of nailable steel flooring panels extending in a transportation vehicle to a position adjacent, but laterally spaced from, a generally vertical wall in said vehicle; at least one gap closure flap attached to a first face of said end closure effective to engage the vehicle wall in interference fit and close the gap between said end closure and said vehicle wall; in engaged position said flap being at least partially deformed and thereby urging said insert into engagement with said nailable steel flooring panel and said vehicle wall; and retainer means separate from said closure flap located on said first face urging said insert into engagement with said nailable steel flooring panel.

22. An insert according to claim 21 wherein indexing means are provided on a second face of said insert opposite to said first face to direct said insert into place in engagement with said panel.

23. An insert according to claim 22 wherein said insert is adapted to be put into place after said nailable steel flooring has been placed in said vehicle and wherein said indexing means comprise a contour to direct said insert into place between said nailable steel flooring and said vehicle wall.

24. An insert according to claim 22 wherein a combination gap closure flap and said retainer flap is provided on said first face.

25. An insert according to claim 24 wherein said combination flap is attached to the upper portion of said first face.

26. An insert according to claim 23 wherein said combination flap engages said first face both at the top and bottom thereof and wherein said combination flap is adapted to be deformed upon installation and urge said end closure into engagement with said nailable steel flooring panel.

27. An insert according to claim 22 wherein said indexing means act in cooperation with said retainer means to maintain said insert in place in engagement with said panel and said vehicle wall.

28. An insert according to claim 21 wherein said gap closure flap comprises an upper closure flap and said retainer means comprise a retainer flap located below said gap closure flap.

29. An nailable steel flooring insert comprising: a plastic member including a generally vertical end closure closing one of the vertical openings which occurs at opposite ends of nailable steel flooring panels extending in a transportation vehicle to a position adjacent, but laterally spaced from a generally vertical wall in said vehicle: a combination gap closure flap and retainer flap attached to a first face of said end closure effective to close the gap between said end closure and said vehicle wall, and maintain said insert in engagement with said nailable steel flooring panel and said vehicle wall; and indexing means comprising at least one indexing tab provided on a second face of said insert opposite to said first face having a contour to direct said insert into place in engagement with said panel, and wherein said indexing tab acts in cooperation with said combination flap to maintain said insert in place.

30. An insert according to claim 29 wherein said contour includes a tapered portion.

31. A nailable steel flooring insert comprising: a plastic member including a generally vertical end closure closing one of the vertical openings which occurs at opposite ends of nailable steel flooring panels extending in a transportation vehicle to a position adjacent, but laterally spaced from, a generally vertical wall in said vehicle; at least one gap closure flap attached to a first face of said end closure effective to engage the vehicle wall in interference fit and close the gap between said end clouure and said vehicle wall; in engaged position said flap being at least partially deformed and thereby urging said insert into engagement with said nailable flooring panel and said vehicle wall; and retainer means separate from said closure flap urging said insert into engagement with said nailable steel flooring panel.

32. In a transportation vehicle wherein nailable steel flooring panels extend along the floor in the vehicle to a position adjacent, but laterally spaced from, a generally vertical wall in the vehicle, and wherein said panels have vertical openings at opposite ends thereof; the improvement comprising: a plastic nailable steel flooring insert including a generally vertical end closure closing one of the vertical openings which occurs at opposite ends of nailable steel flooring panels extending in a transportation vehicle to a position adjacent, but laterally spaced from, a generally vertical wall in said vehicle; at least one gap closure flap attached to a first face of said end closure effective to engage the vehicle wall in interference fit and close the gap between said end closure and said vehicle wall; in engaged position said flap being at least partially deformed and thereby urging said insert into engagement with said nailable steel flooring panel and said vehicle wall.

33. The improvement according to claim 32 wherein said nailable steel flooring insert includes retainer means, separate from said closure flap, urging said insert into engagement with said nailable steel flooring panel.

34. The improvement according to claim 33 wherein said retainer means comprises a retainer portion affixed to a second face of said insert opposite to said first face which retainer portion engages at least a portion of said panel.

35. The improvement according to claim 34 wherein indexing means are provided on said second face to direct said insert into place in engagement with said panel.

36. The improvement according to claim 33 wherein said retainer means comprises a retainer portion attached to said first face which retainer portion engages said vehicle wall.

37. The improvement according to claim 36 wherein indexing means are attached to a second face of said insert opposite to said first face to direct said insert into place in engagement with said wall.

38. The improvement according to claim 37 wherein said retainer portion comprises a second flap located below said gap closure flap.

39. The improvement according to claim 37 wherein said retainer portion and said gap closure flap are combined into a single flap.

* * * * *

UNITED STATES PATENT AND TRADEMARK OFFICE
CERTIFICATE OF CORRECTION

PATENT NO. : 4,085,683
DATED : April 25, 1978
INVENTOR(S) : Gary L. Harting, Robert F. Sutter, Lowell I. Malo It is certified that error appears in the above-identified patent and that said Letters Patent are hereby corrected as shown below:

Column 4, line 9, "generaly" should read --generally--.
Column 8, line 26, "clouure" should read --closure--.
Claim 26, the dependency should read --25--, and not "23".

Signed and Sealed this

Twelfth Day of September 1978

[SEAL]

Attest:

RUTH C. MASON
Attesting Officer

DONALD W. BANNER
Commissioner of Patents and Trademarks